(12) United States Patent
Shi et al.

(10) Patent No.: US 11,556,170 B2
(45) Date of Patent: Jan. 17, 2023

(54) INTELLIGENT INTERFACE BASED ON AUGMENTED REALITY

(71) Applicant: NORTHWEST INSTRUMENT INC., Dover, NJ (US)

(72) Inventors: Xin Shi, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 0 days.

(21) Appl. No.: 17/380,287

(22) Filed: Jul. 20, 2021

(65) Prior Publication Data

US 2021/0349525 A1    Nov. 11, 2021

Related U.S. Application Data

(63) Continuation-in-part of application No. 15/547,939, filed as application No. PCT/CN2016/007045 on Jan. 8, 2016, now Pat. No. 11,069,100.

(30) Foreign Application Priority Data

Jan. 7, 2016    (CN) .......................... 201610008470.1

(51) Int. Cl.
*G06F 3/01*    (2006.01)
*G06T 7/70*    (2017.01)
(Continued)

(52) U.S. Cl.
CPC ............ *G06F 3/011* (2013.01); *G02B 27/017* (2013.01); *G06F 3/04817* (2013.01); *G06T 7/70* (2017.01);
(Continued)

(58) Field of Classification Search
None
See application file for complete search history.

(56) References Cited

U.S. PATENT DOCUMENTS 10,031,489 B2    7/2018    Nixon et al.
10,473,473 B2    11/2019    Shi et al.
(Continued)

FOREIGN PATENT DOCUMENTS

CN    101350153 A    1/2009
CN    101350153 A    2/2011
(Continued)

OTHER PUBLICATIONS

World Intellectual Property Organization (WIPO) International Search Report for PCT/CN2016/070454 dated Oct. 11, 2016 2 pages.

*Primary Examiner* — Yi Wang
(74) *Attorney, Agent, or Firm* — Anova Law Group, PLLC

(57) ABSTRACT

An interaction method implemented by a terminal apparatus includes: obtaining an interface underlayer of a space that has direction information and distance information; establishing a mapping relationship between an external device and an identification corresponding to the external device marked on the interface underlayer, the identification indicating a physical location of the external device; receiving, from the external device, property information of the external device; obtaining an image of a real scene in the space; determining that a target object is depicted in the image of the real scene; determining target presentation information of the target object according to the property information of the external device; and displaying the image of the real scene together with the target presentation information, the target presentation information being added to the image as an augmented reality (AR) mark at an image location corresponding to the target object.

20 Claims, 6 Drawing Sheets

(51) Int. Cl.
*G06T 19/00* (2011.01)
*G06F 3/04817* (2022.01)
*G02B 27/01* (2006.01)
*G06T 7/80* (2017.01)
*G06V 20/20* (2022.01)

(52) U.S. Cl.
CPC .............. *G06T 7/80* (2017.01); *G06T 19/006* (2013.01); *G06V 20/20* (2022.01)

(56) References Cited

U.S. PATENT DOCUMENTS

| | | |
|---|---|---|
| 2005/0029764 A1 | 2/2005 | Tanaka |
| 2007/0179645 A1 | 8/2007 | Nixon et al. |
| 2009/0210071 A1 | 8/2009 | Agrusa et al. |
| 2012/0195491 A1 | 8/2012 | Zhang et al. |
| 2012/0319895 A1 | 12/2012 | Bruchiel |
| 2014/0267717 A1 | 9/2014 | Pitzer et al. |
| 2014/0317944 A1 | 10/2014 | Kumagai et al. |
| 2015/0058779 A1 | 2/2015 | Bruck et al. |
| 2015/0123995 A1 | 5/2015 | Zavodny et al. |
| 2016/0005229 A1* | 1/2016 | Lee .......................... G06T 11/60 345/419 |
| 2016/0205123 A1 | 7/2016 | Almurayh |
| 2017/0024917 A1 | 1/2017 | Deitrich |
| 2017/0108236 A1 | 4/2017 | Guan et al. |
| 2018/0075643 A1 | 3/2018 | Sequeira et al. |

FOREIGN PATENT DOCUMENTS

| | | |
|---|---|---|
| CN | 101254242 B | 2/2013 |
| CN | 103383262 A | 11/2013 |
| CN | 103777204 A | 5/2014 |
| CN | 102611753 B | 1/2015 |
| CN | 104501803 A | 4/2015 |
| CN | 104634222 A | 5/2015 |
| CN | 204514232 U | 7/2015 |
| CN | 104501803 B | 4/2017 |
| EP | 2824525 A1 | 1/2015 |
| EP | 3260813 A1 | 12/2017 |
| GB | 2513238 A | 10/2014 |
| WO | 2014103989 A1 | 7/2014 |

* cited by examiner

INTELLIGENT INTERFACE BASED ON AUGMENTED REALITY

CROSS-REFERENCE TO RELATED APPLICATION

This application is a continuation-in-part application of U.S. patent application Ser. No. 15/547,939. U.S. patent application Ser. No. 15/547,939 is a national stage application of PCT Patent Application No. PCT/CN2016/070454, filed on Jan. 8, 2016, which claims priority to Chinese Patent Application No. 201610008470.1, filed on Jan. 7, 2016, the entire content of all the above-mentioned applications are incorporated herein by reference.

TECHNICAL FIELD

The present disclosure relates to the field of interactive control, and more particularly to an intelligent interface.

BACKGROUND

Currently, using a ranging device to measure and plan routes and areas is required almost in all aspects of people's life and work, such as in the field of construction, road engineering, transportation, pipeline laying, garden landscape, etc. Commonly used ranging devices are laser rangefinder and ranging wheel.

Various ranging device structures have been disclosed in prior art. For example, CN201420143325.0 discloses an inner and outer optical path switching system of a laser rangefinder for realizing switch of the laser rangefinder in two working status of an inner optical path and an outer optical path. The switching system includes a laser source, a half transmitting half-reflecting mirror, a reflecting mirror, a shading plate, a motor and a motor-driven circuit. The shading plate is fixed on a rotating shaft of the motor and is driven by the motor to select to be at a first shading position or a second shading position. The laser emitted by the laser source is divided into two light waves of ranging light and inner reference light through the half-transmitting half-reflecting mirror. The ranging light penetrates through the half-transmitting half-reflecting mirror and forms the outer optical path. The inner reference light is reflected by the reflecting mirror and forms the inner optical path. For another example, CN201410152898.4 discloses a single optical path laser ranging system for accurate determination of the distance of measured object. The ranging system comprises a microprocessor, a signal generator, a laser generator, and a photodiode and frequency mixer. The microprocessor controls the signal generator to output two groups of pulse signals. One group of pulse signals are respectively sent to the laser generator and the photodiodes, to form a photoelectric mixed signal used by the outer optical path. Another group of pulse signals are sent to the frequency mixer for frequency mixing to generate a reference signal used by ranging. The microprocessor synchronously samples the photoelectric mixed signal and the reference signal, and calculates the voltage values of both signals to accurately obtain a measured distance value.

However, it can be seen, from the technical solutions disclosed above, that conventional ranging device can only perform straight line ranging, none of them is capable of achieving the following functions: 1. measuring both a curve line route and a straight line distance, generating measurement drawings, directly designating line marking and dotting; 2. adding remark and description text, images, voice and video to the identification point; 3. performing synthetic imaging on ranging routes and real scene photos to enhance the visualizability; 4. monitoring and controlling the status of an intelligent device on a map. These issues greatly limit the application of ranging device.

SUMMARY

In accordance with the disclosure, there is provided an interaction method implemented by a terminal apparatus. The method includes: obtaining an interface underlayer of a space, the interface underlayer including a measurement drawing having direction information and distance information; establishing a mapping relationship between the external device and an identification corresponding to the external device marked on the interface underlayer, the identification indicating a physical location of the external device; receiving, from the external device, property information of the external device; obtaining an image of a real scene in the space; determining that a target object is depicted in the image of the real scene; determining target presentation information of the target object according to the property information of the external device; and displaying, on a display screen corresponding to the terminal apparatus, the image of the real scene together with the target presentation information, the target presentation information being added to the image as an augmented reality (AR) mark at an image location corresponding to the target object.

In accordance with the disclosure, there is also provided a terminal apparatus including a memory and a processor coupled to the memory. The processor is configured to perform: obtaining an interface underlayer of a space, the interface underlayer including a measurement drawing having direction information and distance information; establishing a mapping relationship between the external device and an identification corresponding to the external device marked on the interface underlayer, the identification indicating a physical location of the external device; receiving, from the external device, property information of the external device; obtaining an image of a real scene in the space; determining that a target object is depicted in the image of the real scene; determining target presentation information of the target object according to the property information of the external device; and displaying, on a display screen corresponding to the terminal apparatus, the image of the real scene together with the target presentation information, the target presentation information being added to the image as an augmented reality (AR) mark at an image location corresponding to the target object.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

Figure 1:
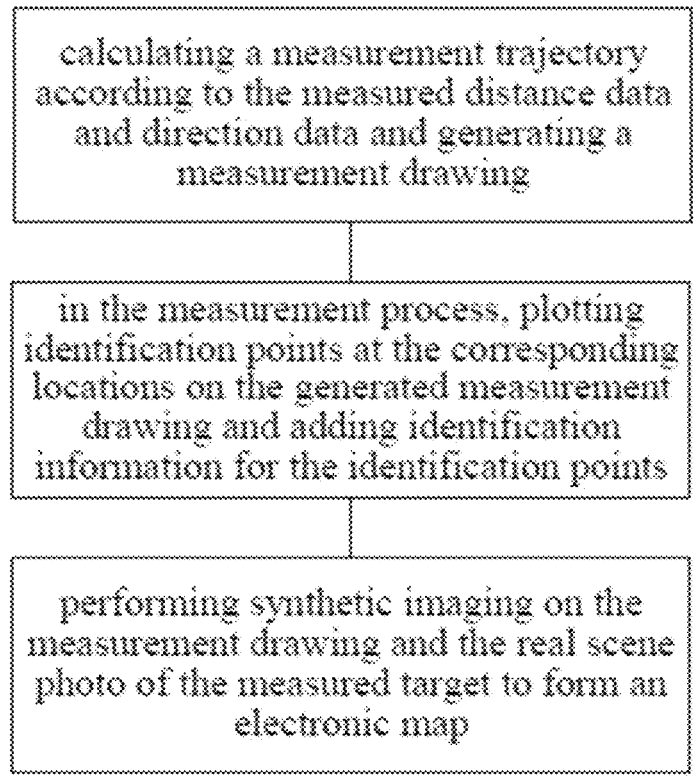
FIG. 1 is a schematic diagram of a forming process of an underlayer of an intelligent interactive interface of the present disclosure.

Other features, characteristics, advantages, and benefits of the present disclosure will become more apparent through the following detailed description with reference to accompanying drawings.

DETAILED DESCRIPTION OF THE EMBODIMENTS

Embodiments of the present disclosure are described in detail below with reference to the accompanying drawings. Same or similar reference numerals in the drawings represent the same or similar elements or elements having the same or similar functions throughout the specification. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

Figure 2:
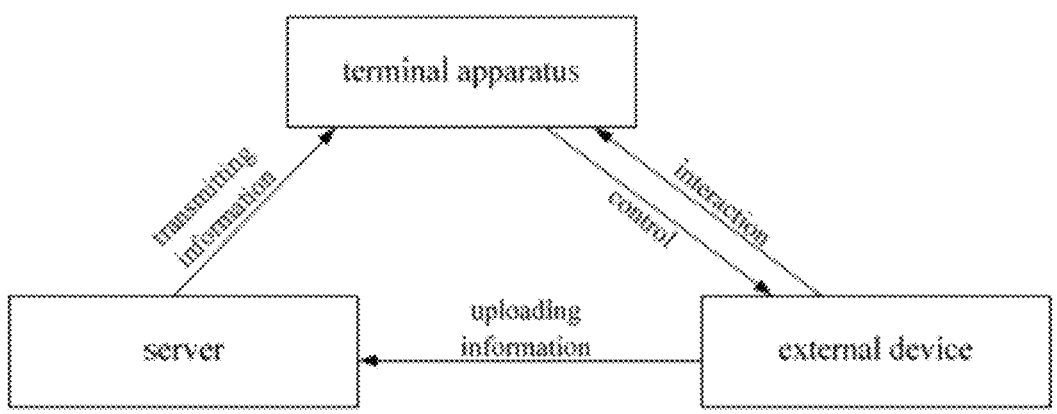
FIG. 2 is a principal schematic diagram of an intelligent interactive interface of the present disclosure.

Referring to FIG. 1 and FIG. 2, an intelligent interactive interface is disclosed by the present disclosure and the intelligent interactive interface enables a terminal apparatus to realize functional interactions such as controlling, monitoring an external device. The external device may be a home appliance or an industrial equipment. The intelligent interactive interface mainly comprises an interface underlayer, a plurality of identifications and a terminal apparatus. The interface underlayer is drawn from trajectory formed by measurement, and preferably is an electronic map formed by performing synthetic imaging on a measurement drawing generated by ranging and a real scene photo. Thereby an electronic map is generated which implements both straight line measurement and curve line measurement, and also has many functions such as dotting, identification description; meanwhile, by wireless connecting the electronic map with an external device, the electronic map can have the function of real-time remote monitoring, greatly improving the working efficiency of intelligent ranging. It is noteworthy that, in the measurement process, the due north direction is found as the initial measurement direction by rotating an azimuth sensor disposed on the measurement apparatus.

The measurement drawing is generated by the measurement trajectory which is calculated according to the measured distance data and direction data. In particular, the distance data is measured by the corresponding ranging device. The ranging device may be a measurement device such as rangefinder, ranging wheel, total station instrument. The ranging device collects distance data as well as direction data, and transmits the data to the terminal apparatus through wireless transmission. Of course, parts of the data may also be collected by the terminal apparatus, such as collecting direction data by a gyroscope built in cellphone. The terminal apparatus decodes the received data according to internal protocol, calculates and displays the data after unit conversion. The operations of decoding, calculating and unit conversion herein may use well-known, commonly used methods of decoding and calculation and will no longer be discussed in detail.

If selecting the ranging wheel as the ranging device, the ranging device may also be used for measurement of irregular routes such as curve line, polygonal line. The ranging wheel continuously rotates, and the measured distance data is uploaded via Bluetooth to the terminal apparatus. The terminal apparatus receives the distance data from the ranging wheel, and meanwhile continuously obtains the current direction data of the ranging wheel. The direction data may be obtained through an angle sensor, e.g. sensors such as electronic gyroscope, accelerometer. The angle sensor may be connected to the terminal apparatus via Bluetooth or directly disposed inside the terminal apparatus.

After receiving the distance data and the direction data, the terminal apparatus will perform trigonometric functions calculation, based on these two data, to obtain a moving vector of the ranging wheel as well as a plurality of current location points. Connecting these location points will form the measurement trajectory and generate the corresponding measurement drawing at the same time. The measurement drawing herein is formed in the ranging process, i.e., in real time. It is not necessary to draw after the ranging process is finished. The terminal apparatus in the present disclosure may be devices such as cellphone, tablet computer, computer.

In this embodiment, the trigonometric functions calculation formulas for the current location points are as follows:

$$X=OX+\sin(R)*L$$

$$Y=OY+\cos(R)*L$$

wherein, x represents the X-axis coordinate of the current location point, Y represents the Y-axis coordinate of the current location point, OX is the X-axis coordinate of last point, OY is the Y-axis coordinate of last point, R is the directional angle value when obtaining the distance value, L is the distance difference value of the current location point and the last point, (X, Y) is the calculated location of the current location point.

Then the measurement drawing and the real scene photo of the measured target are synthesized to form the interface underlayer, i.e., an electronic map, which can improve the visualizability of the measurement trajectory. The specific synthesis process is as follows: take a real scene photo of the measured target; then measure the measured target using the ranging device of the present disclosure to obtain the measurement trajectory; and generate a corresponding measurement drawing or directly use an already obtained measurement drawing; overlap and synthesize this measurement trajectory and the real scene photo. In the synthesis process, parameters such as the perspective angle, perspective distance, direction of the trajectory are adjusted to make the trajectory aligned and attached to the measured target. Of course, the interface underlayer may also be directly formed by the measurement drawing which is formed by surveying and mapping without synthesizing with a real scene photo.

In the measurement process, when it is required to record the location of the external device, an identification may be added to the current location of the generated measurement drawing. Each identification corresponds to an external device at the current location. If it is further required to add corresponding identification information to the identification, then this identification is selected for which to add an identification information. The identification information is mainly the property information of the external device.

The external device is connected to the terminal apparatus in a wired or wireless way. Interactive control of the external device may be implemented by the terminal apparatus. The property information and working data of the external device is uploaded and stored in a server and displayed through the interface underlayer. That is, a one-to-one mapping relationship between the information of the external device (including the property information and working data) and the external device is established. As such, when a cursor of the terminal apparatus pauses on or clicks the identification, the information of the corresponding external device is displayed on the terminal apparatus. The identification as well as the identification information corresponding to the identification on the measurement drawing can be edited, moved or deleted. Generally speaking, the terminal apparatus is connected to the external device and is used to display the interface underlayer, identification and control and/or exchange information with the external device.

The identification information herein is not limited to the format of text, picture, video or voice and the identification and information is uploaded in real time and stored in the internal database of the terminal apparatus for later viewing and use at any time. Thus the added identification information can be newly added, or can be read directly from the database for use. For instance, the added picture can be newly taken photo or can also be selected from the existing album of the terminal apparatus. The newly added identification point and identification information will also be stored in the database in real time for convenient call.

When the information (i.e., the identification information herein) of the external device is abnormal, especially the working data, the intelligent interactive interface of the present disclosure will give out alarm information and the alarm information is given out in form of voice or light flickering through the terminal apparatus.

Under network environment, the identification point and its corresponding identification information can both synchronized to a cloud server for permanent storage and on-demand distribution. As such, it is ensured that the identification data is not prone to loss, and can be called at any time conveniently.

In addition, the present disclosure may also pause the measurement in the measurement process, and continue the measurement after the location of the ranging device is adjusted, which can control the ranging process very well. In practice, the pause function is implemented by a pause/continue button disposed on the ranging device or terminal apparatus. When the measurement is paused, any one of the previous identifications may also be re-selected as a new starting point for measurement. Any one of existing generated measurement drawings may also be opened and the measurement is continued from the end of last measurement, or any one of previous identifications is re-selected as a new starting point for measurement. Controlling the ranging process according to the user requirement is thus accomplished, greatly improving the flexibility of the ranging process.

The present disclosure provides an intelligent interactive interface, comprising: an interface underlayer drawn from trajectory formed by measurement; a plurality of identifications disposed on the interface underlayer, each of the identifications corresponds to an external device, information of the external device is uploaded in real time, displayed on the interface underlayer and capable of being stored on a server, and a mapping relationship being established between the information of the external device and the corresponding identification of respective external device; a terminal apparatus to connect to the external device and display the interface underlayer, the identifications, and control the external device and/or exchange information with the external device; wherein the information of the external device is displayed on the terminal apparatus, in real time, through the identifications and the identifications can be added or deleted in real time.

In some embodiments, the interface underlayer is an electronic map formed by performing synthetic imaging on measurement drawing generated by ranging and a real scene photo; or the interface underlayer is directly formed by the measurement drawing generated by ranging.

In some embodiments, the measurement drawing is formed in real time in a measurement process.

In some embodiments, trigonometric functions calculation is made according to the measured distance data and direction data to obtain a plurality of location points and connecting the plurality of location points forms the measurement drawing.

In some embodiments, when a cursor of the terminal apparatus is paused on the identification or clicking the identification point, the information of the corresponding external device is displayed on the terminal apparatus.

In some embodiments, trigonometric functions calculation formulas of the current location point are:

$$X=OX+\sin(R)*L$$

$$Y=OY+\cos(R)*L$$

wherein X represents the X-axis coordinate of the current location point, Y represents the Y-axis coordinate of the current location point, OX is the X-axis coordinate of the last point, OY is the Y-axis coordinate of the last point, R is the directional angle value when obtaining the distance data, L is a difference value of the distances between the current location point and the last point.

In some embodiments, in the measurement process, the identification is marked at the location on the generated measurement drawing corresponding to the external device and identification information is added in the server for the identification.

In some embodiments, the identification information comprises any one of picture, text, voice, and video.

In some embodiments, in the ranging process, the measurement is paused or any one of the previous identifications is re-selected as a new starting point for measurement.

In some embodiments, any one of existing generated measurement drawings is opened and the measurement is continued from the end of last measurement.

In some embodiments, the intelligent interactive interface gives out alarm information when the information of the external device is abnormal.

In some embodiments, in the process of synthesizing the measurement drawing and the real scene photo of a measured target, the perspective angle, the perspective distance and direction of the measurement drawing are adjusted to make the measurement drawing aligned and attached to the measured target.

In some embodiments, the information of the external device comprises the inherent property and working data of the external device.

In some embodiments, in the measurement process, the due north direction is found as the initial measurement direction by rotating an azimuth sensor disposed on the measurement apparatus.

The beneficial effects of some embodiments of the present disclosure are: 1. The disclosed method and device can measure the distance of various routes such as straight line, curve line and polygonal line. 2. The disclosed method and device can generate measurement drawings in real time according to actual measurement, and can direct the line marking, dotting according to the measurement drawing, or add identification descriptions to identification points in form of, but not limited to, picture, text, video or voice. 3. The disclosed method and device can perform synthetic imaging on a measurement drawing and a real scene photo to enhance the visualizability. 4. The disclosed method and device can perform remote real-time monitor and control of an electronic map and thus greatly improve its working efficiency.

Figure 3:
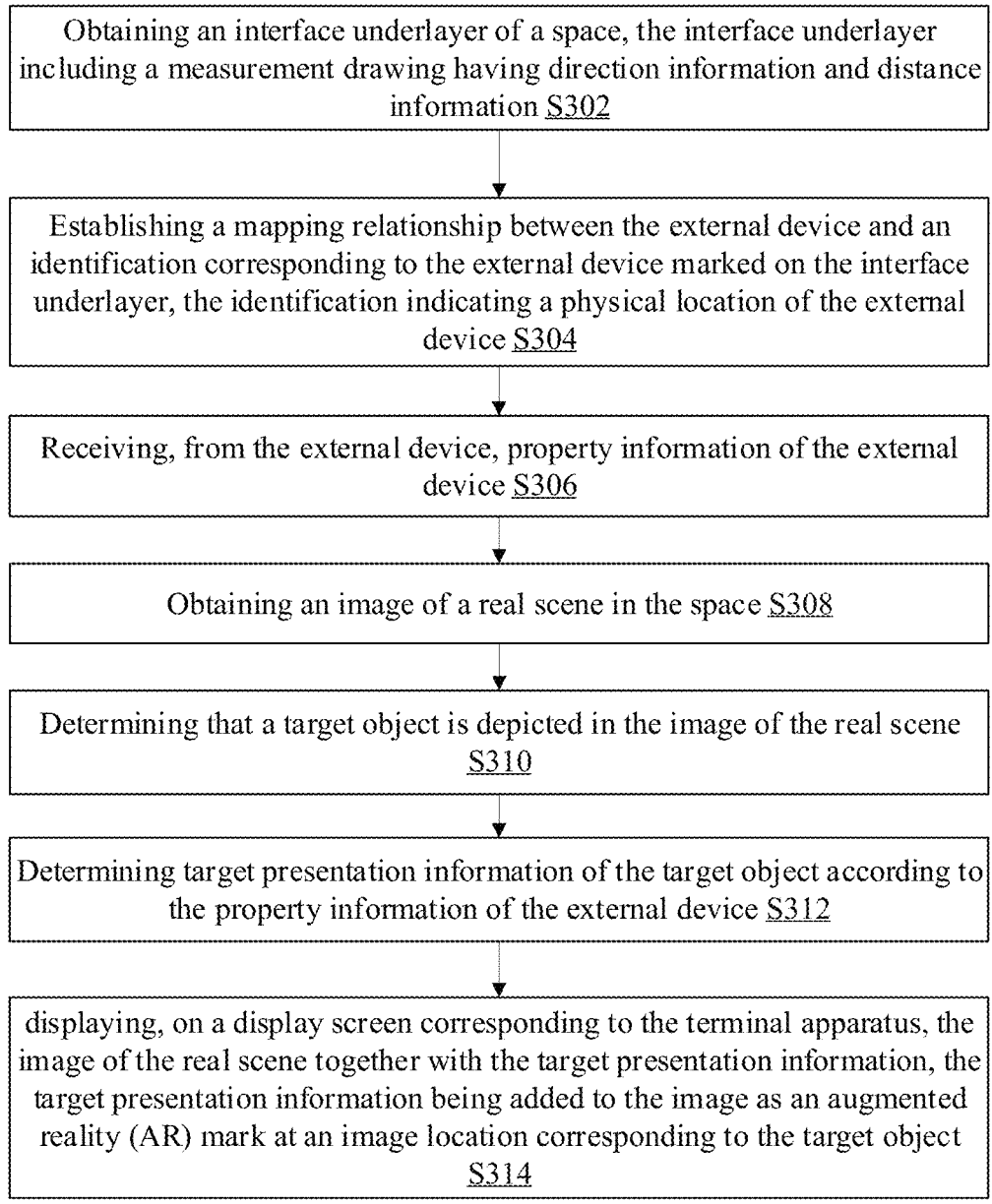
FIG. 3 is a structural diagram of an interaction process based on augmented reality (AR) according to an example embodiment of the present disclosure.

The present disclosure also provides an interaction method based on augmented reality (AR). The method can be implemented by a terminal apparatus. As shown in FIG. 3, the terminal apparatus may obtain an interface underlayer of a space (S302). The interface underlayer includes a measurement drawing having direction information and distance information. The measurement drawing may be generated according to measurement of a 3D space (e.g., and objects in the 3D space) performed by a ranging device. In one embodiment, the terminal apparatus may be connected to the ranging device and generate the interface underlayer according to the measurement drawing. In another embodiment, the terminal apparatus may obtain the measurement drawing from a file stored locally or transmitted online.

At least one external device may be marked on the interface underlayer. The terminal apparatus can establish a mapping relationship between an external device and an identification corresponding to the external device marked on the interface underlayer (S304). The identification on the interface underlayer indicates a physical location of the external device. The procedure of making the identification and establishing the mapping relationship can be similar to the process described in previous embodiments and is not repeated herein.

The terminal apparatus and the external device can be connected and the terminal apparatus can receive information from the external device (S306). Information exchange can be performed between the terminal apparatus and the external device when they are connected. The external device may transmit various types of property information to the terminal apparatus, such as characteristics information, current status information, record information, control options, etc. The characteristics information can indicate one or more general features of the external device that does not change often, such as name, model, dimensions, operation capacity, and other characteristics relating to general functions of the external device. In some embodiments, if the external device corresponds to another object of interest, the characteristics information may further include features of the object of interest, such as name, type, model, etc. The status information may indicate current operation status of the external device, such as on/off status, battery level, volume, brightness, status measured by sensor(s) on the external device, and other status relating to functions of the external device. The record information may include any record kept by the external device, such as operation log, historical record, saved medium object (e.g., picture, text, audio, video), etc. The control options may include options available to be used by the terminal apparatus for controlling the external device, such as read data (e.g., navigate a control menu, query a record or a status), write data (e.g., adjust an operation parameter), etc. The terminal apparatus may send a control instruction to the external device. The control instruction may be in correspondence with the control options provided by the external device. When receiving the control instruction, the external device is configured to follow the control instruction and perform corresponding actions, such as sending read data to the terminal apparatus, write data received from the terminal apparatus to the external device, adjust operation parameter and send adjusting result (e.g., success/fail, or adjusting result with corresponding operation details), provide an upper/lower control menu items based on navigation control instruction, etc.

Figure 4A:
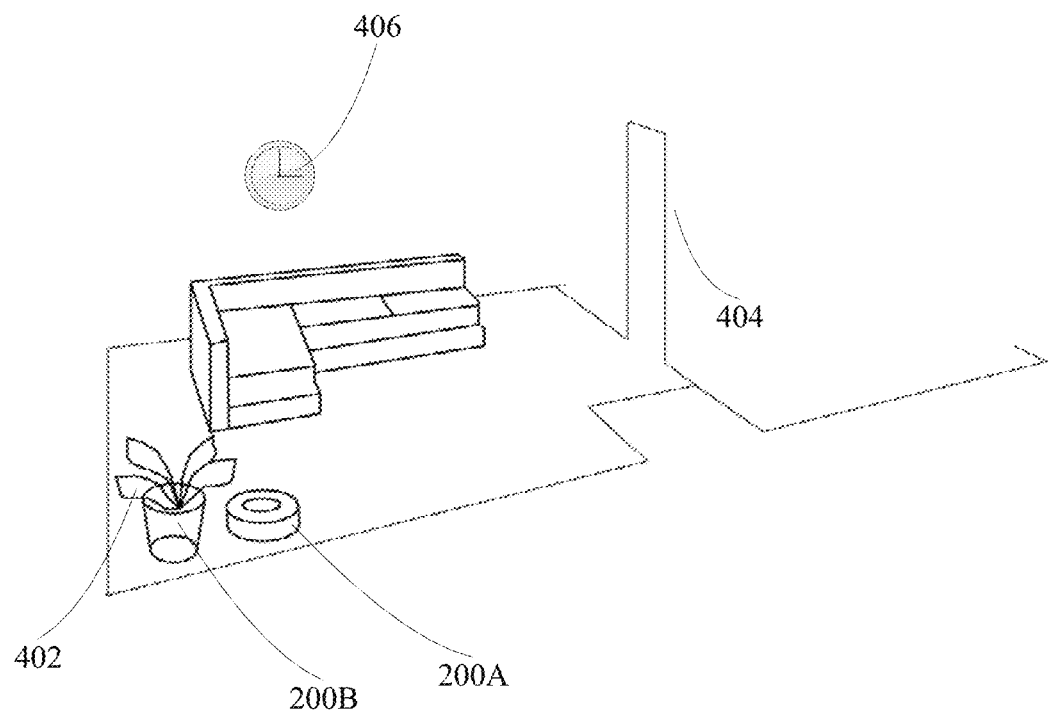
FIG. 4A is an illustrative diagram showing a real scene according to an example embodiment of the present disclosure.
Figure 4B:
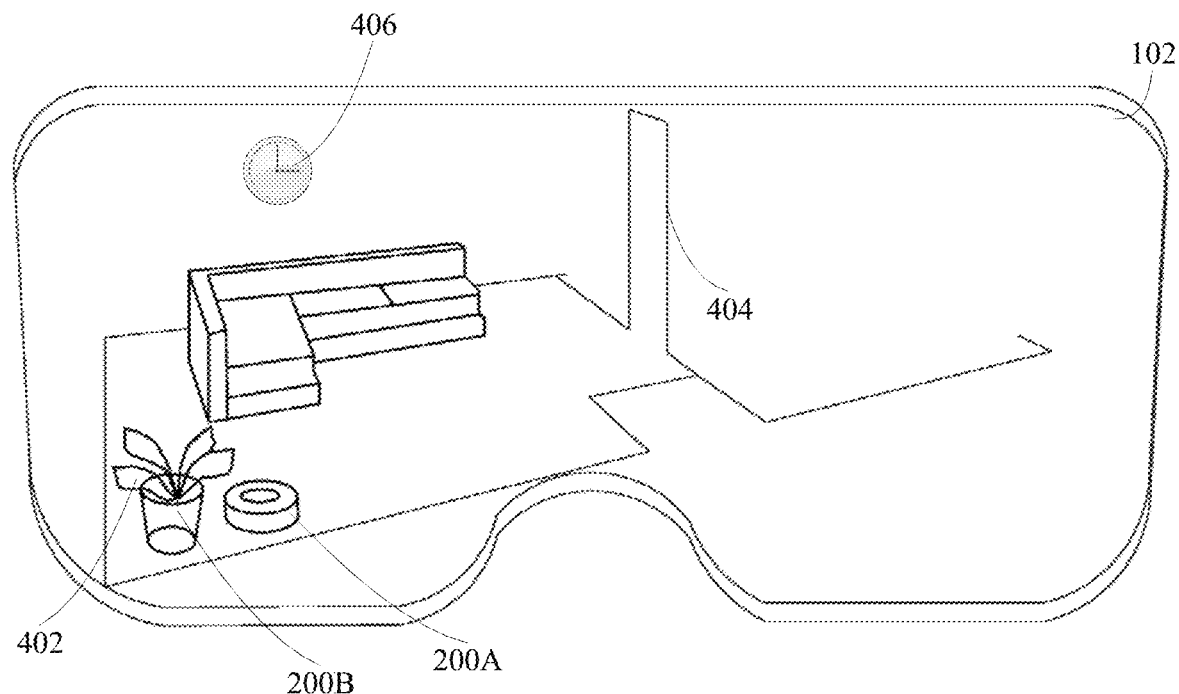
FIG. 4B is an illustrative diagram showing a displayed image of real scene according to an example embodiment of the present disclosure.
Figure 8:
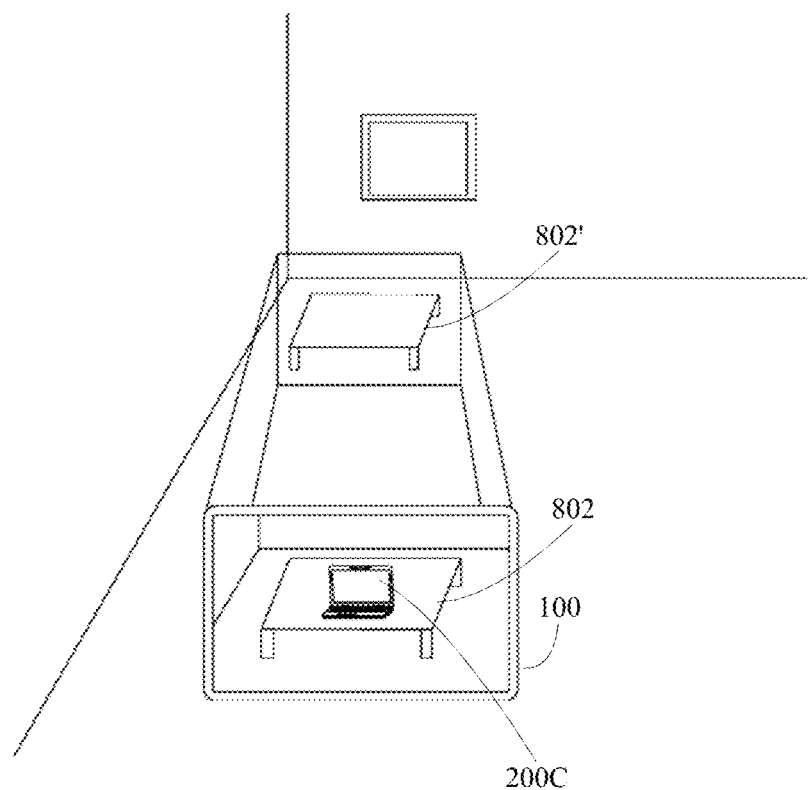
FIG. 8 is an illustrative diagram showing an application scenario according to an example embodiment of the present disclosure.

The terminal apparatus obtains an image of a real scene in the space (S308). The image of the real scene may be obtained through any proper imaging device associated with the terminal apparatus, such as AR glasses and/or a camera embedded in the terminal apparatus. The image of the real scene may be captured and obtained in real time. The image of the real scene may describe and include one or more objects. The one or more objects may include a target object. The target object may be the external device, or an object of user interest corresponding to the external device. The object of user interest may not have capability to establish communication and interact with the terminal apparatus. For example, a smart soil sensor having communication capabilities can be inserted to a pot having a plant. The plant can be the object of interest, and the smart soil sensor can be the external device corresponding to the object of interest. The image of the real scene may be displayed at a display device associated with the terminal apparatus in real time, such as a display screen of the terminal apparatus, AR glasses, etc. When the imaging device is moved and/or rotated, the image of the real scene may be updated accordingly. For example, a room shown in FIG. 4A can be captured and displayed as an image through AR glasses 102 as shown in FIG. 4B. The image may include objects such as external device 200A (a cleaning robot), external device 200B (a soil sensor), a plant 402, a door 404, and a clock 406. FIG. 8 shows another example where an image of a corner of the room is shown on a terminal apparatus 100.

Returning to FIG. 3, the terminal apparatus may determine that a target object is depicted in the image of the real scene (S310). For example, the interface underlayer of the space shown in FIG. 4 may include at least two external devices: a cleaning robot 200A and a soil sensor 200B. It can be determined that two target objects are depicted in the image of the real scene shown in FIG. 4: the cleaning robot 200A, and the plant 402 corresponding to the soil sensor 200B.

In some embodiments, S310 may further include performing a calibration process and determining a location and an orientation of the terminal apparatus in the interface underlayer; determining a target location of the external device relative to the terminal apparatus according to the location of the terminal apparatus in the interface underlayer and the identification of the external device in the interface underlayer; and determining that the external device is in the image of the real scene if the orientation of the terminal apparatus indicates that the terminal apparatus is facing toward the external device.

Figure 5:
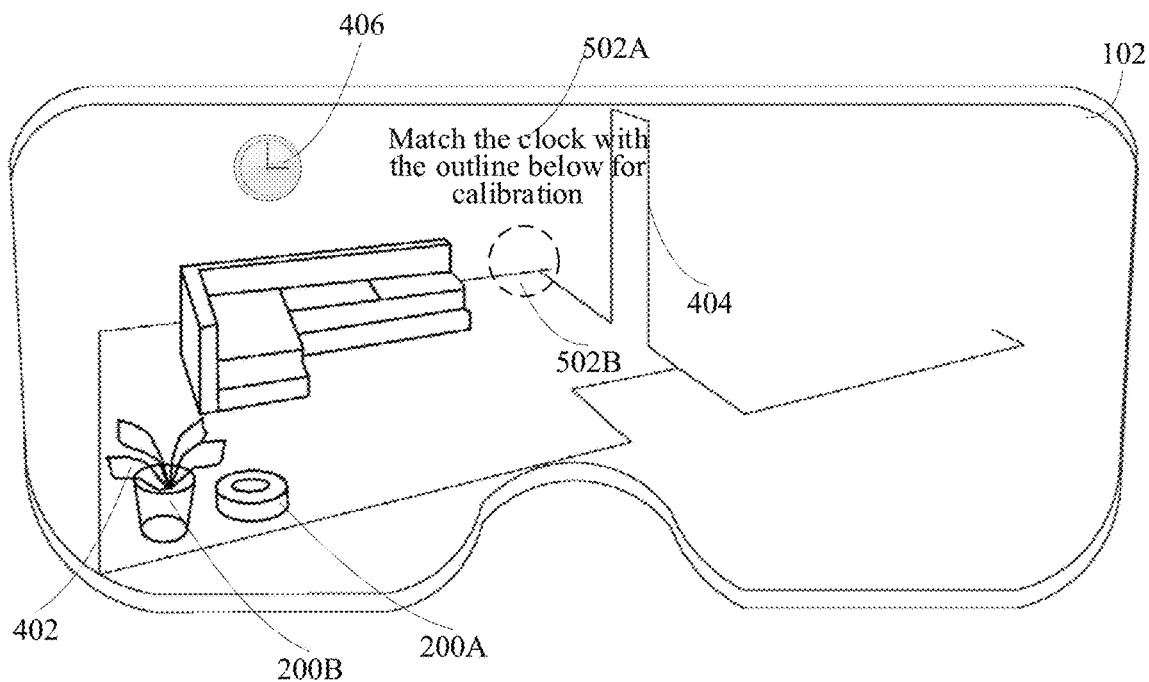
FIG. 5 is an illustrative diagram showing a calibration interface according to an example embodiment of the present disclosure.

The calibration process may start when the terminal apparatus activates AR function. For example, when showing the image of the real scene, the terminal apparatus may automatically activate the AR function or prompt the user to activate the AR function. Upon receiving an AR activation instruction, the terminal apparatus may perform the calibration process to determine a location and an orientation of the imaging device of the terminal apparatus on the interface underlayer. The terminal apparatus may display instructions and guide the user to complete the calibration process. FIG. 5 is an illustrative diagram showing a calibration interface according to an example embodiment of the present disclosure. For example, as shown in FIG. 5, a calibration icon 502B may be added to the real time image shown on the display device 102 of the terminal apparatus at a preset image location, such as added to a center of the real time image. The calibration icon indicates an expected outline of a calibration object 406 to be found. The terminal apparatus may also display a guidance message 502A to inform the user to find and point to the calibration object in the real scene so that the calibration object shown in the image of the real scene match the expected outline. The calibration object has a corresponding location and orientation in the interface underlayer. Said correspondence can be established during the ranging process and/or according to the measurement drawing. The user can move and point the imaging device at the calibration object in the real scene to make the calibration object shown in the real time image match the calibration icon. Upon determining that the calibration object included in the image of the real scene matches the expected outline, it is determined that terminal apparatus is located at a reference point with a reference orientation on the interface underlayer.

It can be understood that the calibration process is performed under the assumption that the location of the calibration object remains at the reference point since the time of generating the measurement drawing.

In one embodiment, the user may manually confirm that the calibration object shown in the real time image matches the calibration icon. In another embodiment, the terminal apparatus may determine whether the calibration object included in the image of the real scene matches the expected outline (i.e., the calibration icon) according to the image of the real scene and prestored image data corresponding to the calibration object. In one example, the calibration object matching the expected outline may refer to that the calibration object is shown at the preset image location with an outline overlapping the expected outline. In another example, the terminal apparatus can compare image data in an area indicated by the calibration icon (e.g., an area covered by the expected outline or an area including and greater than the area covered by the expected outline) with the prestored image data of the calibration object to obtain a comparison result, and the calibration object matching the expected outline may refer to that a similarity between the image data of the area indicated by the calibration icon and the prestored image data is greater than a similarity threshold.

If the comparison result indicates that the calibration object is nearby but not yet completely match with the calibration icon (e.g., part of the area indicated by the calibration icon matches part of the prestored image data), the terminal apparatus may determine a distance and a direction of the calibration object relative to the terminal apparatus according to the real time image, and determine the location of the terminal apparatus in the interface underlayer accordingly. Alternatively, the terminal apparatus may provide movement instructions according to the matching parts, such as move closer/further away, turn to right/left, point higher/lower, so that the user can move the imaging device to make the calibration object accurately match the calibration icon.

Upon determining that the calibration object included in the image of the real scene matches the expected outline, it is determined that terminal apparatus is located at a reference point with a reference orientation on the interface underlayer. In some embodiments, a location of the reference point and the reference orientation, the calibration icon, and the preset image location are recorded during a process of generating the measurement drawing with a ranging device. For example, when the calibration object matches with the expected outline, a distance and a direction of the calibration object relative to the terminal apparatus is determined as the location and orientation corresponding to the calibration icon. Further, a distance and relative orientation between the calibration object and a reference point in the measurement drawing are known according to their 3D coordinates. During ranging, an image of the calibration object is taken by a camera located at the reference point and oriented at a reference orientation. The orientation and location of the reference point are recorded. The image of the calibration object can be used to generate the calibration icon and record the preset image location. During calibration, when the calibration object matches the calibration icon on the real time image, it is determined that the imaging device of the terminal apparatus is moved to the location of the reference point with the reference orientation. In this way, the location and orientation of the imaging device of the terminal apparatus on the interface underlayer is determined to be the same as the recorded location and orientation of the reference point.

In some embodiments, an expected image location of the external device in the image of the real scene can be determined according to the identification (physical location) of the external device in the interface underlayer and the location and the orientation of the terminal apparatus in the interface underlayer. For example, when the calibration process is completed, the terminal apparatus can determine expected location and orientation of any objects marked in the interface underlayer. The terminal apparatus may be moved after the calibration process and the image of the real scene may be updated in real time. Further, the terminal apparatus may update its location and orientation on the interface underlayer in real time based on its movement. In some embodiments, the target object may be an object marked in the interface underlayer. The terminal apparatus can determine whether an object marked in the interface underlayer is expected to be depicted in the image of the real scene according to the location and orientation of the terminal apparatus on the interface underlayer and the location of the object in the interface underlayer. Here, "expected to be depicted" refers to an assumption that the location of the object has not changed since the interface underlayer is obtained. If the physical location of the object is changed, the location of the object marked on the interface underlayer is incorrect, and the object may not appear in the image of the real scene when the terminal apparatus is facing the marked location. In some embodiments, the terminal apparatus may display an object marked in the interface underlayer but occluded in the image of real scene (e.g., by overlaying said object in the image of the real scene). For example, the image of the real scene shown in FIG. 4 does not show details inside the bedroom on the right side because such details are blocked by walls of the room. The interface shown in FIG. 6 can include layout 608 of the bedroom according to the interface underlayer.

In some embodiments, the terminal apparatus may compare current image data at the expected image location of the image of the real scene with prestored image data of the external device; and upon determining that the current image data does not match the prestored image data, displaying a reminder message indicating that a current location of the external device in the real scene is not consistent with the physical location of the external device recorded in the interface underlayer. For example, as shown in FIG. 8, a table 802' in the real scene is shown in the image on the terminal apparatus 100 as table 802. An external device 200C (a laptop) expected to be on the table 802 according to its identification in the interface underlayer is not actually on the table. This situation may occur when the interface underlayer is a design layout and the target object is not yet placed to the expected location yet. In this case, the terminal apparatus may guide the user to move the external device so that the external device occurs at the expected image location, to implement the design layout. In another example, the external device is desired to be moved away from its previous location, and the terminal apparatus may guide the user to point the terminal apparatus to the new location of the external device and update the physical location of the external device in the interface underlayer according to the new location. The guidance provided by the terminal apparatus may be displayed as AR mark added to the image of the real scene as well.

In some embodiments, the terminal apparatus may determine whether a target object is depicted in the image of the real scene by comparing the image of the real scene with prestored image/model data corresponding to the target object and determining whether there is an area/section in the image of the real scene that is similar to the prestored image/model data. For example, object recognition may be performed on the image of the real scene to determine edges/outlines of candidate objects in the image. When comparing with each candidate object, the prestored image/model data may be resized, rotated and/or cropped according to the edges/outlines of the candidate object. Other image features may also be used for comparison such as color information.

In some embodiments, the terminal apparatus may determine that a target object is depicted in the image of the real scene according to user selection. For example, the user may select an object in the image of the real scene as the target object.

In some embodiments, the location and size of the target object in the image of the real scene is determined. In cases where the target object is automatically determined by the terminal apparatus (e.g., by activating the AR function or comparing image with prestored object image data), the location and the size of the target object is already determined in the automatic determination process. In cases where the target object is manually selected by a user, edge detection may be performed in the image area selected by the user, and an outline of the target object may be obtained according to the result of edge detection, as well as its location and size information. In some embodiments, a frame equal to or slightly bigger than a bounding box containing the target object at its center may be used to represent the location and size of the target object in the interface underlayer.

Returning to FIG. 3, the terminal apparatus may determine target presentation information of the target object according to the property information of the external device (S312). When the target object is the external device, the target presentation information may be obtained directly from the property information of the external device. When the target object is not an external device, the terminal apparatus may determine a target external device corresponding to the target object, and determine the target presentation information according to the property information of the target external device. As used herein, a target object that is not an external device but has a corresponding external device may be referred to as an object of interest. As used herein, an external device may refer to the external device identified as the target object and/or the external device corresponding to the object of interest identified as the target object. In one embodiment, the object of interest also has a mapping relationship with an identification on the interface underlayer. In another embodiment, when the object of interest is not yet marked in the interface underlayer, the mapping relationship can be established according to the relative location between the terminal apparatus and the object of interest (e.g., determined according to the image of the real scene), and the location and orientation of the terminal apparatus on the interface underlayer.

Figure 6:
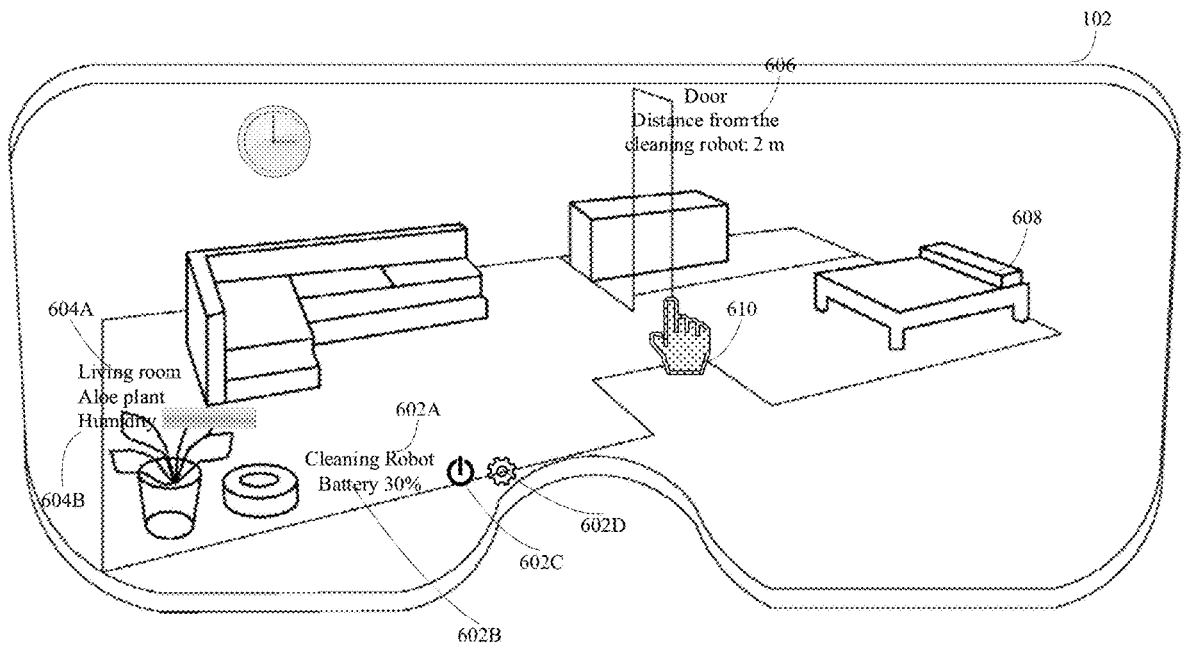
FIG. 6 is an illustrative diagram showing an image with AR mark according to an example embodiment of the present disclosure.
Figure 7:
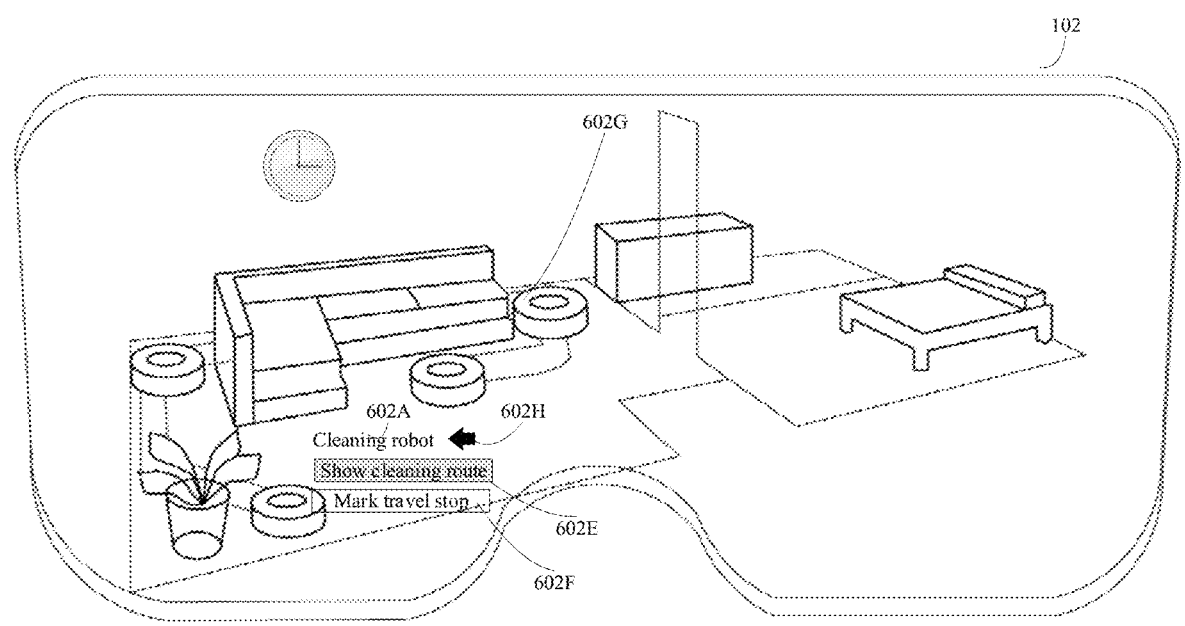
FIG. 7 is an illustrative diagram showing another image with AR mark according to an example embodiment of the present disclosure.

The terminal apparatus displays, on a display screen corresponding to the terminal apparatus, the image of the real scene together with the target presentation information (S314). The target presentation information is added to the image as an augmented reality (AR) mark at an image location corresponding to the target object. The AR mark can include one or more of an image, a text, a video. In some embodiments, the AR mark may further include an audio that can be played when the target object is determined and/or upon receiving a user instruction to play audio related to the target object. The audio may be a voice converted from the displayed text, and/or a sound effect related to the displayed text/image/video. FIGS. 6-7 shows some interface examples of AR mark being added/overlaid to the image of the real scene shown in FIG. 4.

The target presentation information and the corresponding AR mark can include various information related to the target object. In some embodiments, the target presentation information includes identity of the target object. The identity may be a result from object recognition of the object of interest, or a name/model of the external device obtained from the characteristics information or the interface underlayer. The AR mark may show, for example, "flower", "table", "apple tree Row 3 Column 5", "light switch 2", "fridge", "living room light", "robot vacuum". The AR marks 602A and 604A shown in FIGS. 6-7 are both examples of characteristics information of target objects.

In some embodiments, the target presentation information may indicate location and/or size of the target object. The location and/or size information can be determined according to the measurement drawing and/or the image of the real scene. The location may be described by a distance between the target object and another object (e.g., the terminal apparatus, an external device, the reference point used in calibration, etc.). The size may be described by dimension information, such as length, width, height, volume of the target object or the bounding box of the target object.

Correspondingly, the AR mark can show, for example, "1 meter from you", "2 meter from the door", "height: 30 cm", etc.

In some embodiments, the target presentation information may include status information and/or record information of the external device obtained through the communication between the terminal apparatus and the external device. For example, the AR mark for a target object may show: "battery level: 80%", "freezer temp: 4° F.", "status: heating", "soil humidity: dry, time to add water", "up and running for 30 hours 20 minutes". The AR marks 602B and 604B shown in FIGS. 6-7 are both examples of status information of target objects.

In some embodiments, the target presentation information may include control options of the external device obtained through the communication between the terminal apparatus and the external device. The AR mark may be used as user interface (UI) item to facilitate the user to interact with the external device through the terminal apparatus. The UI item or sub-items shown as the AR mark may correspond to control options provided by the external device. For example, some examples of UI item and sub-item used as the AR mark may include: "check operation status", "change name", "return to main menu", "adjust volume", "search operation log", a text input box, etc. The AR marks 602C through 602H shown in FIGS. 6-7 are all examples of UI items corresponding to the target object 200A.

In some embodiments, after displaying the AR mark, the terminal apparatus may generate a control instruction upon detecting a user operation on the AR mark; and send the control instruction to the external device, the control instruction being configured to instruct the external device to perform a corresponding action.

In some embodiments, after sending the control instruction, the terminal apparatus may receive a feedback information corresponding to the control instruction; update the target presentation information according to the feedback message; and display the updated target presentation information as an updated AR mark.

In some embodiments, when the control instruction corresponds to a write action of adjusting a parameter of the external device, the feedback message includes an execution result indicating whether the corresponding action is executed successfully; and when the control instruction corresponds to a read action of querying a record of the external device, the feedback message includes a query result.

In some embodiments, when the AR mark is displayed as one or more user interface (UI) items corresponding to one or more control options of the external device, and generating the control instruction includes: upon detecting that the user operation is performed on a UI item having one or more sub-items, updating the AR mark to display the one or more sub-items; and upon detecting that the user operation is performed on a UI item or a sub-item corresponding to a control option of the external device, generating the control instruction according to the user operation and the control option. That is, the AR mark may be used as user interface (UI) to interact with the external device. The AR mark may display icons and/or menu items indicating control options of the external device, and upon detecting user operation on a displayed icon or menu item, the terminal apparatus may perform an action corresponding to the icon or menu item. The action may include sending a control instruction to the external device, and/or displaying one or more additional control options corresponding to the selected icon or menu item. The action may further include receiving a feedback of the control instruction from the external device. For example, the AR mark can include an on/off toggle icon; and when the toggle icon is selected, the terminal apparatus instructs the external device to switch on/off status. In another example, the AR mark can include a volume icon; and when the volume icon is selected, an additional control option, i.e., a volume adjusting bar, is displayed as the AR mark. Upon detecting user operation on the volume adjusting bar, the terminal apparatus sends a control instruction to adjust a volume of the external device. In another example, the AR mark can include main menu items in configuration setting panel of the external device; and when a main menu item is selected, one or more sub menu items can be displayed as the AR mark. In another example, the AR mark may include a text box or an audio input icon to collect user-inputted information. The user-inputted information may be a search query or a voice control command. The terminal apparatus may instruct the external device to respond to the search query; or recognize a control instruction from the voice control command and instruct the external device to follow the control instruction. In another example, the terminal apparatus may receive a feedback from the external device, such as a message indicating success or failure of executing the control instruction, a search result corresponding to the search query, etc. By using the AR mark as control UI, the user can directly control the external device through operations on the AR mark without the need to open a specific control application or use a remote to control the external device.

As shown in FIGS. 6 and 7, the AR mark 602C is a UI item representing an on/off switch and by detecting user operation on 602C, the terminal apparatus can directly instruct the cleaning robot 200A to turn on or turn off. The AR mark 602D is a UI item representing a configuration menu, and upon detecting 602D being selected, AR marks 602E, 602F and 602H representing sub-items may be displayed. Further, upon detecting AR mark 602E "show cleaning route" being selected, 602E may be highlighted, and information about the cleaning route may be obtained from the cleaning robot 200A and rendered as AR mark 602G shown in FIG. 7. In some embodiments, according to the user selection of showing the cleaning route, AR marks 604A and 604B may be hidden or removed from display when showing AR mark 602G. In addition, when AR mark 602F showing "mark travel stop" is selected, the terminal apparatus may detect a user selection at an image location as a stop destination, determine a physical location of the stop destination corresponding to the image location in the interface underlayer, and inform the cleaning robot about the coordinates of the stop destination so that the cleaning robot can update the cleaning route by adding the stop destination. AR mark 602H is a sub-item configured to return to a previous UI item (e.g., mark 602D) upon selection.

In some embodiments, besides current operation status, the target presentation information can provide additional insights in the time dimension. For example, the terminal apparatus may establish mapping relationship with a plurality of external devices located at different sections/areas of the 3D space corresponding to the interface underlayer. When one external device appears in the image of the real scene, the AR mark corresponding to the external device can show both a malfunction status and a time when the malfunction happens, such as "error occurred 30 minutes ago". The AR mark may also show operation status of itself and a group that the external device belongs to, such as "status: normal, number of malfunction devices in my group: 3."

In some embodiments, after showing the AR mark of a target object, the terminal apparatus may receive a user instruction of providing a distance between the target object and another object. For example, as shown in FIG. 6, the target object may be 200A, the other object selected by user (e.g., shown as 610) may be the door. AR mark 606 shows the distance between the cleaning robot and the door. If the other object is marked in the interface underlayer, the terminal apparatus can directly determine a first vector between the target object and the other object according to their coordinates in the interface underlayer. If the other object is not marked in the interface underlayer, the terminal apparatus may determine a second vector between the other object and itself through its measurement function and/or the image of the real scene, and determine the distance between the other object and the target object according to the second vector and a third vector from the target object to the terminal apparatus.

The terminal apparatus is configured to determine a location of any object in a captured image relative to itself (e.g., depth information, orientation information of the object) by using any proper measurement techniques, such as using image data of two or more cameras, ranging data from Lidar sensor, using data from other sensors such as location sensor, proximity sensor, inertial sensor, field sensor, or a combination thereof.

The terminal apparatus is configured to detect a user selection on the image of the real scene. The user selection may be a touch operation on a touch screen of the terminal apparatus, a voice selection captured by an audio device of the terminal apparatus, a hand/body gesture recognized by the terminal apparatus, etc.

The terminal apparatus is associated with a display device and an imaging device. In some embodiments, the display device and/or the imaging device may be embedded in the terminal apparatus. In some embodiments, the display device and/or the imaging device may be a separate device connected to the terminal apparatus. It can be understood that certain embodiments are described based on an assumption that the location of the terminal apparatus is the same as the imaging device. When describing a relative location between the terminal apparatus and an object according to the image of the real scene, it may be interpreted as a distance between the imaging device of the terminal apparatus and the object.

Figure 9:
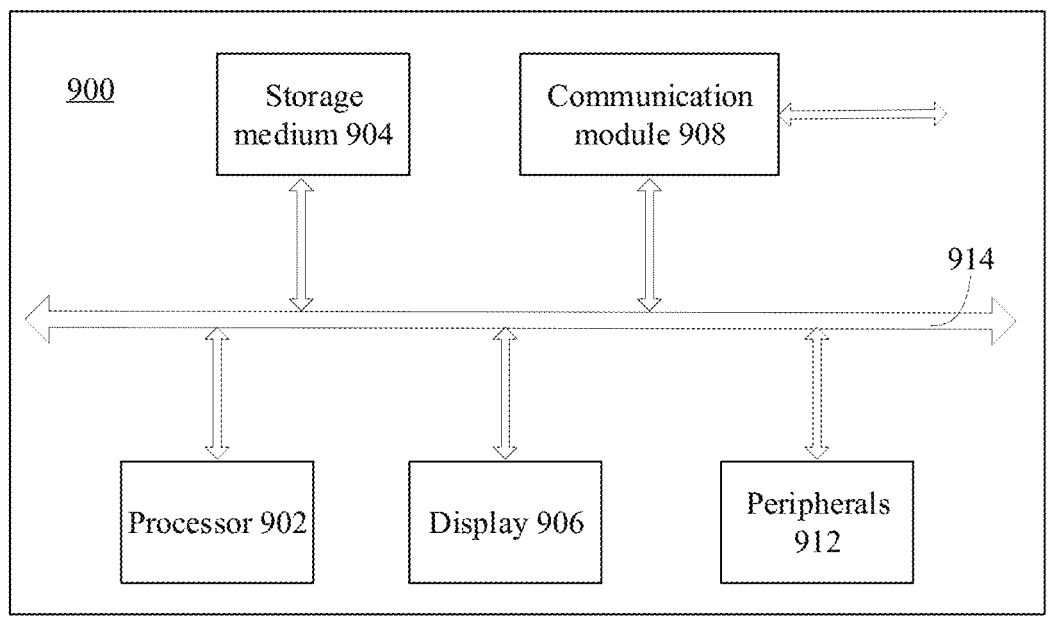
FIG. 9 is a block diagram of an exemplary computing system according to some embodiments of the present disclosure.

FIG. 9 is a block diagram of an exemplary computing system/device capable of implementing the disclosed interaction method according to some embodiments of the present disclosure. As shown in FIG. 9, computing system 900 may include a processor 902 and a storage medium 904. According to certain embodiments, the computing system 900 may further include a display 906, a communication module 908, additional peripheral devices 992, and one or more bus 994 to couple the devices together. Certain devices may be omitted and other devices may be included. The terminal apparatus and/or the external device may be implemented on the computing system 900.

Processor 902 may include any appropriate processor(s). In certain embodiments, processor 902 may include multiple cores for multi-thread or parallel processing, and/or graphics processing unit (GPU). Processor 902 may execute sequences of computer program instructions to perform various processes, such as measuring a distance to a nearby object, exchanging information with another device, displaying AR marks, etc. Storage medium 904 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 904 may store computer programs for implementing various processes, when executed by processor 902. Storage medium 904 may also include one or more databases for storing certain data such as measurement drawings, image and/or model data of certain objects, and certain operations can be performed on the stored data, such as database searching and data retrieving.

The communication module 908 may include network devices for establishing connections through a network. Display 906 may include any appropriate type of computer display device or electronic device display (e.g., AR glasses, touch screens). Peripherals 992 may include additional I/O devices, such as a controller, a microphone, and so on.

In operation, the processor 902 may be configured to execute instructions stored on the storage medium 904 and perform various operations related to an interaction method as detailed in the previous descriptions.

Although various embodiments of the present disclosure have been described, it is apparent to those skilled in the art that various changes and modifications can be made without departing from the spirit and scope of the present disclosure to achieve one or more advantages of the present disclosure. For those skilled in the art, one or more components may be replaced by other components performing the identical functions. It should be understood that the features described herein with reference to a particular drawing can be combined with another feature in another drawing, even if such a case is not explicitly mentioned. In addition, the method of present disclosure may be implemented all by software being executed by a processor or may be implemented in a hybrid manner by a combination of hardware logic and software logic to achieve the same result. Such modifications to the embodiments of the present disclosure are intended to be covered by the appended claims.

What is claimed is:

1. An interaction method, implemented by a terminal apparatus, comprising:

obtaining an interface underlayer of a space, the interface underlayer including a measurement drawing having direction information and distance information;

establishing a mapping relationship between an external device and an identification corresponding to the external device marked on the interface underlayer, the identification indicating a physical location of the external device;

receiving, from the external device, property information of the external device;

obtaining an image of a real scene in the space;

determining that a target object is depicted in the image of the real scene;

determining target presentation information of the target object according to the property information of the external device; and displaying, on a display screen corresponding to the terminal apparatus, the image of the real scene together with the target presentation information, the target presentation information being added to the image as an augmented reality (AR) mark at an image location corresponding to the target object, wherein the target object is the external device, and determining that the target object is depicted in the image of the real scene comprises:

determining a target location of the external device relative to the terminal apparatus according to a location of the terminal apparatus in the interface underlayer and the identification of the external device in the interface underlayer; and determining that the external device is in the image of the real scene if an orientation of the terminal apparatus indicates that the terminal apparatus is facing toward the external device.

2. The method according to claim 1, wherein the target object is the external device or an object of interest corresponding to the external device.

3. The method according to claim 1, wherein:

the property information of the external device includes at least one of characteristics information of the external device, current status information of the external device, record information on the external device, or control options of the external device.

4. The method according to claim 1, after displaying the AR mark, further comprising:

generating a control instruction upon detecting a user operation on the AR mark; and sending the control instruction to the external device, the control instruction being configured to instruct the external device to perform a corresponding action.

5. The method according to claim 4, wherein the AR mark is displayed as one or more user interface (UI) items corresponding to one or more control options of the external device, and generating the control instruction comprises:

upon detecting that the user operation is performed on a UI item having one or more sub-items, updating the AR mark to display the one or more sub-items; and upon detecting that the user operation is performed on a UI item or a sub-item corresponding to a control option of the external device, generating the control instruction according to the user operation and the control option.

6. The method according to claim 4, after sending the control instruction, further comprising:

receiving a feedback information corresponding to the control instruction;

updating the target presentation information according to the feedback message; and displaying the updated target presentation information as an updated AR mark.

7. The method according to claim 6, wherein:

when the control instruction corresponds to a write action of adjusting a parameter of the external device, the feedback message includes an execution result indicating whether the corresponding action is executed successfully; and when the control instruction corresponds to a read action of querying a record of the external device, the feedback message includes a query result.

8. The method according to claim 1, wherein determining that the target object is depicted in the image of the real scene further comprises: before determining the target location of the external device relative to the terminal apparatus, performing a calibration process and determining the location and the orientation of the terminal apparatus in the interface underlayer.

9. The method according to claim 8, wherein performing the calibration process comprises:

displaying a calibration icon on the image of the real scene at a preset image location, the calibration icon indicating an expected outline of a calibration object; and upon determining that the calibration object included in the image of the real scene matches the expected outline, determining that terminal apparatus is located at a reference point with a reference orientation on the interface underlayer.

10. The method according to claim 9, wherein:

a location of the reference point and the reference orientation, the calibration icon, and the preset image location are recorded during a process of generating the measurement drawing with a ranging device.

11. The method according to claim 8, further comprising:

determining an expected image location of the external device in the image of the real scene according to the identification of the external device in the interface underlayer and the location and the orientation of the terminal apparatus in the interface underlayer.

12. The method according to claim 11, wherein:

comparing current image data at the expected image location of the image of the real scene with prestored image data of the external device; and upon determining that the current image data does not match the prestored image data, displaying a reminder message indicating that a current location of the external device in the real scene is not consistent with the physical location of the external device recorded in the interface underlayer.

13. A terminal apparatus, comprising: a memory, and a processor coupled to the memory and configured to perform:

obtaining an interface underlayer of a space, the interface underlayer including a measurement drawing having direction information and distance information;

establishing a mapping relationship between an external device and an identification corresponding to the external device marked on the interface underlayer, the identification indicating a physical location of the external device;

receiving, from the external device, property information of the external device;

obtaining an image of a real scene in the space;

determining that a target object is depicted in the image of the real scene;

determining target presentation information of the target object according to the property information of the external device; and displaying, on a display screen corresponding to the terminal apparatus, the image of the real scene together with the target presentation information, the target presentation information being added to the image as an augmented reality (AR) mark at an image location corresponding to the target object, wherein the target object is the external device, and determining that the target object is depicted in the image of the real scene comprises:

determining a target location of the external device relative to the terminal apparatus according to a location of the terminal apparatus in the interface underlayer and the identification of the external device in the interface underlayer; and determining that the external device is in the image of the real scene if an orientation of the terminal apparatus indicates that the terminal apparatus is facing toward the external device.

14. The terminal apparatus according to claim 13, wherein the target object is the external device or an object of interest corresponding to the external device.

15. The terminal apparatus according to claim 13, wherein:

the property information of the external device includes at least one of characteristics information of the external device, current status information of the external device, record information on the external device, or control options of the external device.

16. The terminal apparatus according to claim 13, wherein after displaying the AR mark, the processor is further configured to perform:
   generating a control instruction upon detecting a user operation on the AR mark; and
   sending the control instruction to the external device, the control instruction being configured to instruct the external device to perform a corresponding action.

17. The terminal apparatus according to claim 16, wherein the AR mark is displayed as one or more user interface (UI) items corresponding to one or more control options of the external device, and generating the control instruction comprises:
   upon detecting that the user operation is performed on a UI item having one or more sub-items, updating the AR mark to display the one or more sub-items; and
   upon detecting that the user operation is performed on a UI item or a sub-item corresponding to a control option of the external device, generating the control instruction according to the user operation and the control option.

18. The terminal apparatus according to claim 16, wherein after sending the control instruction, the processor is further configured to perform:
   receiving a feedback information corresponding to the control instruction;
   updating the target presentation information according to the feedback message; and
   displaying the updated target presentation information as an updated AR mark.

19. The terminal apparatus according to claim 18, wherein:
   when the control instruction corresponds to a write action of adjusting a parameter of the external device, the feedback message includes an execution result indicating whether the corresponding action is executed successfully; and
   when the control instruction corresponds to a read action of querying a record of the external device, the feedback message includes a query result.

20. The terminal apparatus according to claim 13, wherein determining that the target object is depicted in the image of the real scene further comprises: before determining the target location of the external device relative to the terminal apparatus,
   performing a calibration process and determining the location and the orientation of the terminal apparatus in the interface underlayer.

* * * * *